(12) United States Patent
Zuber et al.

(10) Patent No.: US 10,203,803 B2
(45) Date of Patent: Feb. 12, 2019

(54) TOUCH SCAN MODES DURING DEVICE CHARGING

(71) Applicant: Apple Inc., Cupertino, CA (US)

(72) Inventors: Wesley W. Zuber, Santa Clara, CA (US); David H. C. Shih, Santa Clara, CA (US); Louis W. Bokma, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/475,293

(22) Filed: Sep. 2, 2014

(65) Prior Publication Data

US 2016/0062494 A1    Mar. 3, 2016

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ...... G06F 3/041; G06F 3/044; G06F 3/04107; G06F 3/0416; G06F 3/0418; H02J 7/00; H02J 7/021; H02J 7/022; H02J 2007/0095; H02J 2007/0096; H02J 2007/0098; H02J 2007/0062; H02J 2007/0049; H02J 2007/005; H02J 7/0047; H02J 7/0021; H02J 7/0026; H02J 7/02
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Sardis F Azongha
(74) *Attorney, Agent, or Firm* — Morrison & Foerster LLP (57) ABSTRACT

Touch scan modes for touch sensitive devices during device charge is disclosed. To prevent adverse effects to the touch sensor panel due to inductive noise while the device is charging, the touch controller can switch to a touch scan mode (i.e., power charging touch mode) that can cancel or reduce noise from the touch scan or touch image. Power charging touch modes can include low noise frequency selection, increased number of touch samples employed to calculate an average, and simultaneous sampling. In some examples, a power charging touch mode can be different from a normal touch scan mode (i.e., a touch scan mode when the device is not charging). With the one or more power charging touch modes, false touch readings, erroneous touch location identification, and/or undetected touches can be eliminated or reduced.

18 Claims, 10 Drawing Sheets

(56) References Cited

U.S. PATENT DOCUMENTS

| | | | |
|---|---|---|---|
| 6,310,610 | B1 | 10/2001 | Beaton et al. |
| 6,323,846 | B1* | 11/2001 | Westerman .......... G06F 3/0235 |
| | | | 345/173 |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,294,687 | B1* | 10/2012 | Ksondzyk ............ G06F 3/0418 |
| | | | 178/18.01 |
| 8,296,587 | B2* | 10/2012 | Paniagua, Jr. ............ G06F 1/26 |
| | | | 307/154 |
| 8,479,122 | B2 | 7/2013 | Hotelling et al. |
| 8,847,910 | B2* | 9/2014 | Chen .................. G06F 3/04886 |
| | | | 345/173 |
| 8,874,396 | B1* | 10/2014 | Olson .................. G06F 3/0418 |
| | | | 345/173 |
| 9,182,862 | B2* | 11/2015 | Wu ........................ G06F 3/044 |
| 9,209,802 | B1* | 12/2015 | Maharyta ............. H03K 17/955 |
| 9,425,626 | B2* | 8/2016 | Lee ...................... H04B 5/0037 |
| 9,590,440 | B2* | 3/2017 | Matsumoto ........... H02J 7/0052 |
| 2006/0197753 | A1 | 9/2006 | Hotelling |
| 2009/0180579 | A1* | 7/2009 | Ellis .................... H04W 52/028 |
| | | | 375/345 |
| 2011/0059769 | A1* | 3/2011 | Brunolli ................ G08C 17/02 |
| | | | 455/556.1 |
| 2011/0063993 | A1* | 3/2011 | Wilson .................... G06F 3/044 |
| | | | 370/254 |
| 2013/0141346 | A1* | 6/2013 | Oh ........................ G06F 3/0418 |
| | | | 345/173 |
| 2014/0002407 | A1* | 1/2014 | Badaye ............... G06F 3/04883 |
| | | | 345/174 |
| 2015/0134983 | A1* | 5/2015 | Samorukov .......... H02J 7/0054 |
| | | | 713/300 |
| 2015/0346987 | A1* | 12/2015 | Ren .......................... G06F 1/32 |
| | | | 345/589 |
| 2016/0380462 | A1* | 12/2016 | Zhang ...................... H02J 7/04 |
| | | | 320/107 |
| 2017/0244265 | A1* | 8/2017 | Zhang .................. H01M 10/44 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

TOUCH SCAN MODES DURING DEVICE CHARGING

FIELD OF THE DISCLOSURE

This relates generally to touch sensitive devices, and in particular, to touch scan modes when coupled to a charger.

BACKGROUND OF THE DISCLOSURE

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which may be a clear panel with a touch-sensitive surface. The touch sensor panel can be positioned in front of a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

One limitation of touch sensor panel technologies is that noise can adversely affect the performance of a touch sensor panel device. Noise from sources such as a power adapter can influence the results of a touch sensor panel device. For example, the touch sensor panel device can be coupled to a power adapter to charge a battery of the device. The power adapter can introduce noise while charging, which may prevent a touch sensor panel from distinguishing between a touch event (e.g., a user's contact of a touch sensor panel) and noise influencing the sensors of the touch sensor panel.

SUMMARY

This relates to touch scan modes for touch sensitive devices when coupled to a charger. A power adapter can charge a battery of a device, but can also introduce or add noise during the process of charging the battery. Touch pixels can be stimulated by noise from the power adapter, and can adversely affect one or more components, such as the touch sensor panel. To prevent adverse effects to the touch sensor panel while the device is charging, the touch controller can switch to a touch scan mode (i.e., power charging touch mode) that can cancel or reduce noise from the touch scan or touch image.

Power charging touch modes can include low noise frequency selection, increased number of touch samples employed to calculate an average, and simultaneous sampling. In some examples, a power charging touch mode can be different from a normal touch scan mode (i.e., a touch scan mode when the device is not charging). With the one or more power charging touch modes, false touch readings, erroneous touch location identification, and/or undetected touches can be eliminated or reduced.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modification thereto, does not imply that the illustrated process or any of its steps are necessary to one or more of the examples, and does not imply that the illustrated process is preferred.

Touch-sensitive screens ("touch screens" or "touch-screens") can be used in many electronic devices to display graphics and text, and to provide a user interface through which a user may interact with the devices. A touch screen can detect and respond to contact on the touch screen. A device can display one or more soft keys, menus, and other user-interface objects on the touch screen. A user may interact with the device by contacting the touch screen at locations corresponding to the user-interface object with which the user wishes to interact.

This disclosure relates to touch scan modes for touch sensitive devices when coupled to a charger. A power adapter can charge a battery of a device, but can also introduce or add noise during the process of charging the battery. Touch pixels can be stimulated by noise from the power adapter, and can adversely affect one or more components, such as the touch sensor panel. To prevent adverse effects to the touch sensor panel while the device is charging, a touch controller of the touch sensitive device can switch to a touch scan mode (i.e., power charging touch mode) that can cancel or reduce noise from the touch scan or touch image.

Power charging touch modes can include low noise frequency selection, increased number of touch samples employed to calculate an average, and simultaneous sampling. In some examples, the power charging touch mode can be different from a normal touch scan mode (i.e., touch scan mode when the device is not charging). With the one or more power charging touch modes, false touch readings, erroneous touch location identification, and/or undetected touches can be eliminated or reduced.

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. In other instances, well-known process steps have been described in detail in order to avoid unnecessarily obscuring the described examples. Other applications are possible, such that the following examples should not be taken as limiting.

Figure 1A:
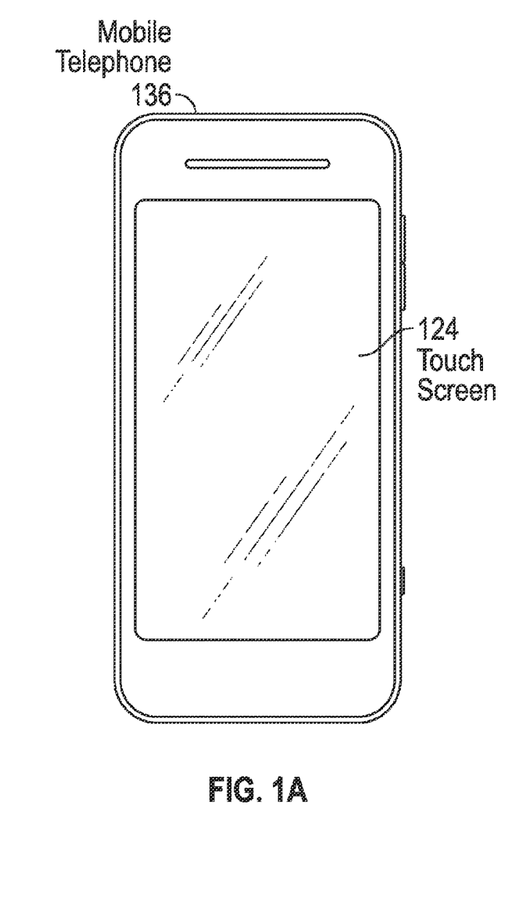
FIGS. 1A-1C illustrate systems in which examples of the disclosure can be implemented.
Figures 1B, 1C:
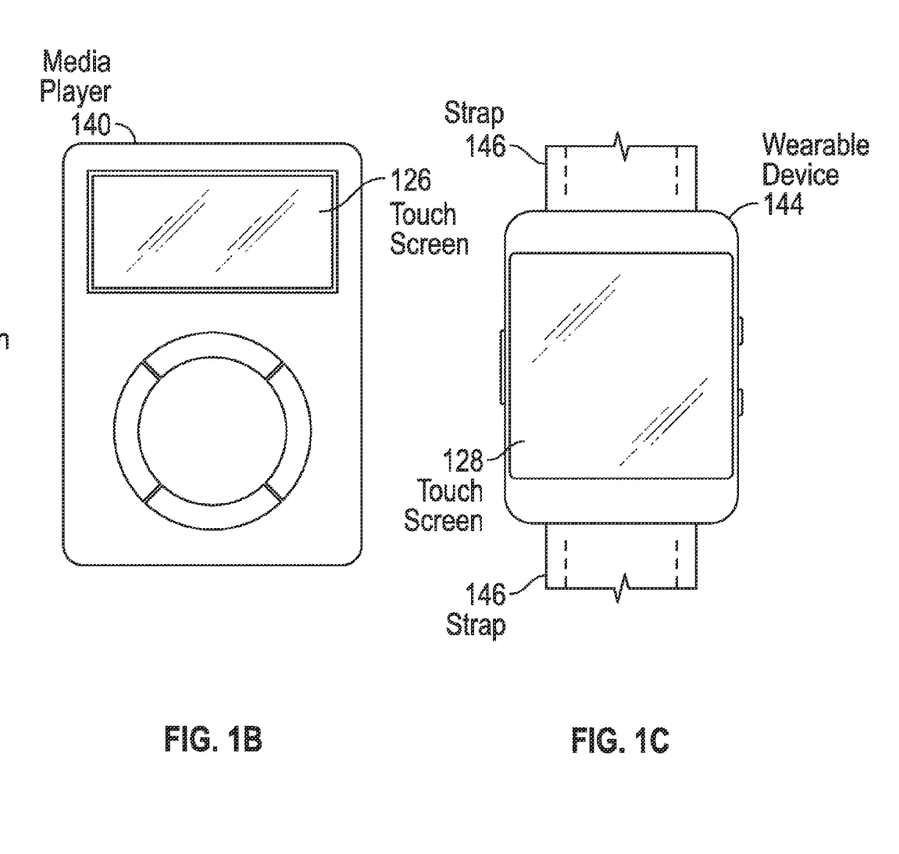

FIGS. 1A-1C illustrate systems in which examples of the disclosure can be implemented. FIG. 1A illustrates an exemplary mobile telephone 136 that can include a touch screen 124. FIG. 1B illustrates an exemplary media player 140 that can include a touch screen 126. FIG. 1C illustrates an exemplary wearable device 144 that can include a touch screen 128 and can be attached to a user using strap 146. The systems of FIGS. 1A-1C can utilize one or more power charging touch modes when coupled to a charger as will be disclosed.

Figure 2:
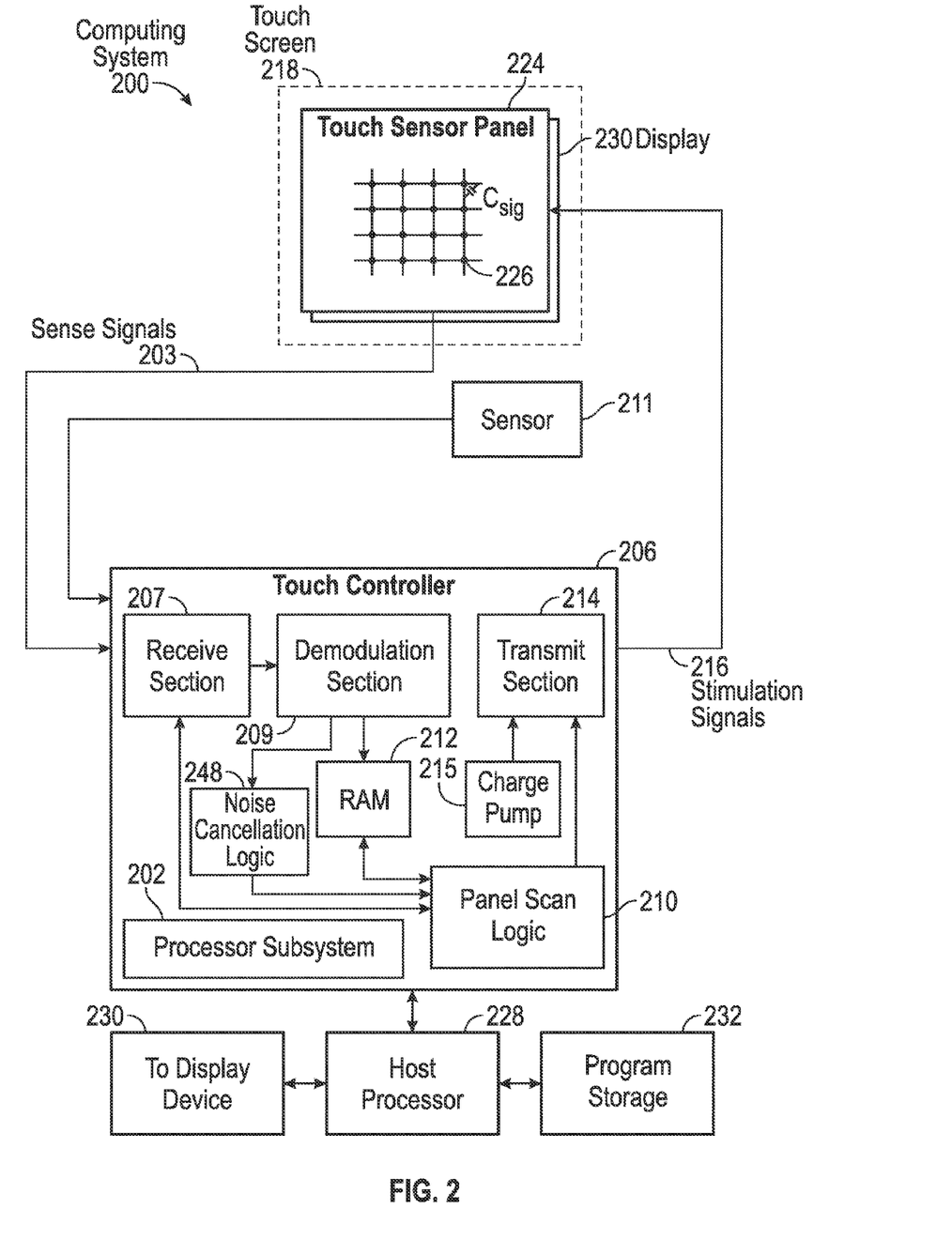
FIG. 2 illustrates an exemplary computing system utilizing the one or more power charging touch modes according to various examples of the disclosure.

FIG. 2 illustrates an exemplary computing system utilizing one or more power charging touch modes according to various examples of the disclosure. Computing system 200 can be included in any electronic device such as the one or more exemplary devices illustrated in FIGS. 1A-1C. Computing system 200 can include a touch controller 206. Touch controller 206 can be a single application specific integrated circuit (ASIC) that can include one or more processor subsystems such as processor subsystem 202, which can include, for example, one or more main processors, such as Arm Cortex M3 processors, ARM968 processors or other processors with similar functionality and capabilities. However, in other examples, some of the processor functionality can be implemented instead by dedicated logic, such as a state machine. Processor subsystem 202 can also include, for example, peripherals such as random access memory (RAM) 212 or other types of memory or storage, watchdog timers (not shown), and the like. Touch controller 206 can also include, for example, receive section 207 for receiving signals, such as touch sense signals 203, from the sense lines of touch sensor panel 224, and other signals from other sensors such as sensor 211, etc. Touch controller 206 can also include, for example, a demodulation section 215, panel scan 210, noise cancellation logic 248, and a drive system including, for example, transmit section 214. Panel scan logic 210 can access RAM 212, autonomously read data from the sense channels, and provide control for the sense channels. In addition, panel scan logic 210 can control transmit section 214 to generate stimulation signals 216 at various frequencies and phases that can be selectively applied to the drive lines of the touch sensor panel 224. Noise cancellation logic 248 can be coupled to demodulation section 215 and panel scan logic 210, as will be described in detail below.

Charge pump 215 can be used to generate the supply voltage for the transmit section. Stimulation signals 216 (Vstim) can have amplitudes higher than the maximum voltage the ASIC processor can tolerate by cascading transistors. Therefore, using charge pump 215, the stimulus voltage can be higher (e.g., 6V) than the voltage level a single transistor can handle (e.g., 3.6 V). Although FIG. 2 shows charge pump 215 separate from transmit section 214, the charge pump can be part of the transmit section.

Touch sensor panel 224 can include a capacitive sensing medium having a plurality of drive lines and plurality of sense lines. The drive and sense lines can be formed from a transparent conductive medium such as Indium Tin Oxide (ITO) or Antimony Tin Oxide (ATO), although other transparent and non-transparent materials such as copper can also be used. In some examples, the drive and sense lines can be perpendicular to each other, although in other examples other non-Cartesian orientations are possible. For example, in a polar coordinate system, the sensing lines can be concentric circles and the driving lines can be radially extending lines (or vice versa). It should be understood, therefore, that the terms "drive lines" and "sense lines" as used herein are intended to encompass not only orthogonal grids, but the intersecting traces or other geometric configurations having first and second dimensions (e.g., the concentric and radial lines of a polar-coordinate arrangement). The drive and sense lines can be formed on, for example, a single side of a substantially transparent substrate.

At the "intersections" of the traces, where the drive and sense lines can pass adjacent to and above and below (cross) each other (but without making direct electrical contact with each other), the drive and sense lines can essentially form two electrodes (although more than two traces could intersect as well). Each intersection of drive and sense lines can represent a capacitive sensing node and can be viewed as touch pixel or node 226, which can be particularly useful when touch sensor panel 224 is viewed as capturing an "image" of touch. (In other words, after touch controller 206 has determined whether a touch event has been detected at each touch sensor in the touch sensor panel 224, the pattern of touch sensors in the multi-touch sensor panel at which a touch event occurred can be viewed as an "image" of touch (e.g., a pattern of fingers touching the panel.) The capacitance between drive and sense electrodes can appear as stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which is a function of Csig.

Computing system 200 can also include host processor 228 for receiving outputs from processor subsystem 202 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like.

Host processor 228 can perform additional functions that may not be related to panel processing, and can be coupled to program storage 232 and display 230, such as an LCD display, for providing a user interface to a user of the device. In some examples, host processor 228 can be a separate component from touch controller 206, as shown. In some examples, host processor 228 can be included as part of touch controller 206. In some examples, the functions of host processor 228 can be performed by processor subsystem 202 and/or distributed among other components of touch controller 206. Display 230 together with touch sensor panel 224, when located partially or entirely under the touch sensor panel 224, can form touch screen 218.

Note that one or more of the functions described above can be performed, for example, by firmware stored in memory (e.g., one of the peripherals) and executed by processor subsystem 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as a CD, CD-R, CD-RW, DVD, DVD-R, or DVD-RW, or flash memory such as compact flash cards, secured digital cards, USB memory devices, memory sticks and the like.

The firmware can be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport readable medium can include, but is not limited to, an electronic, magnetic, optical, electromagnetic, or infrared wired or wireless propagation medium.

Figure 3A:
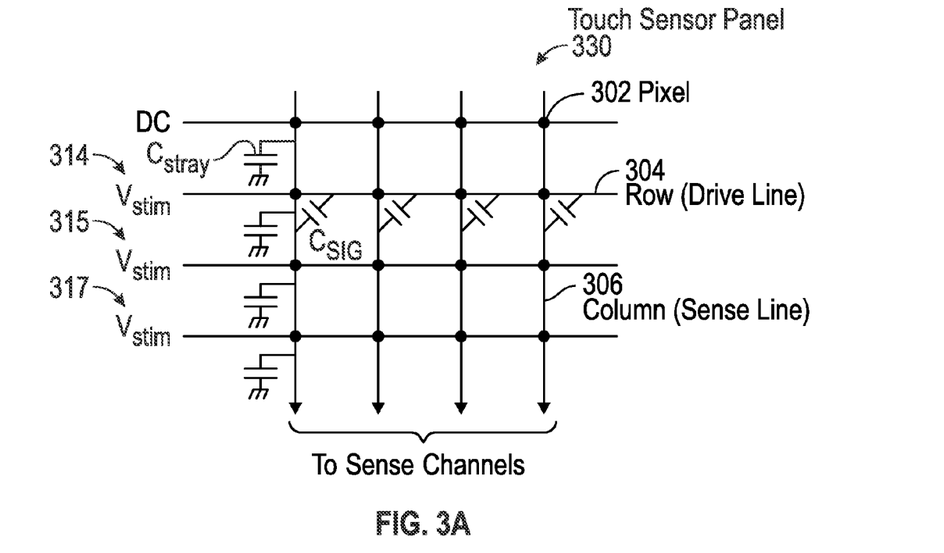
FIG. 3A illustrates an exemplary mutual capacitance touch sensor panel according to examples of the disclosure.

FIG. 3A illustrates an exemplary mutual capacitance touch sensor panel according to examples of the disclosure. A stray capacitance Cstray at each pixel 302 can be located at the intersection of a row 304 and a column 306 trace (although Cstray for only one column is illustrated in FIG. 3A for purposes of simplifying the figure) of the touch sensor panel 330. In the example of FIG. 3A, AC stimuli Vstim 314, Vstim 315 and Vstim 317 can be at different frequencies and phases. Each stimulation signal on a row 304 can cause a charge $Qsig = Csig \times Vstim$ to be injected into the columns through the mutual capacitance Csig present at the affected pixels. A change in the injected charge (Qsig_sense) can be detected when a finger, palm or other object is present at one or more of the affected pixels. Vstim signals 314, 315 and 317 can include one or more bursts of sine waves. Note that although FIG. 3A illustrates rows 304 and columns 306 as being substantially perpendicular, they need not be aligned, as described above. As described above, each column 306 can be connected to a receive channel such as receive section 207 of FIG. 2.

Figure 3B:
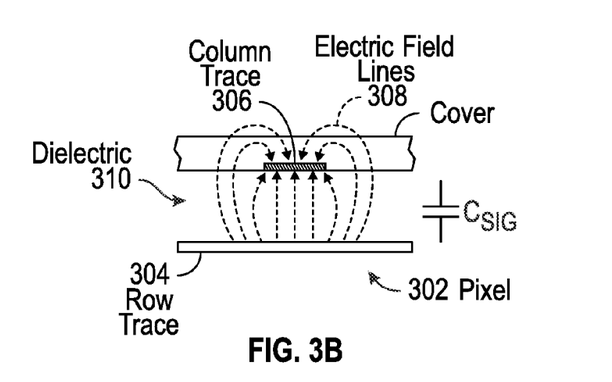
FIG. 3B illustrates a side view of an exemplary pixel in a steady-state (no-touch) condition according to examples of the disclosure.

FIG. 3B illustrates a side view of an exemplary pixel in a steady-state (no-touch) condition according to examples of the disclosure. In FIG. 3B, electric field lines 308 of the mutual capacitance between column 306 and row 304 traces or electrodes separated by dielectric 310 at pixel 302 is shown.

Figure 3C:
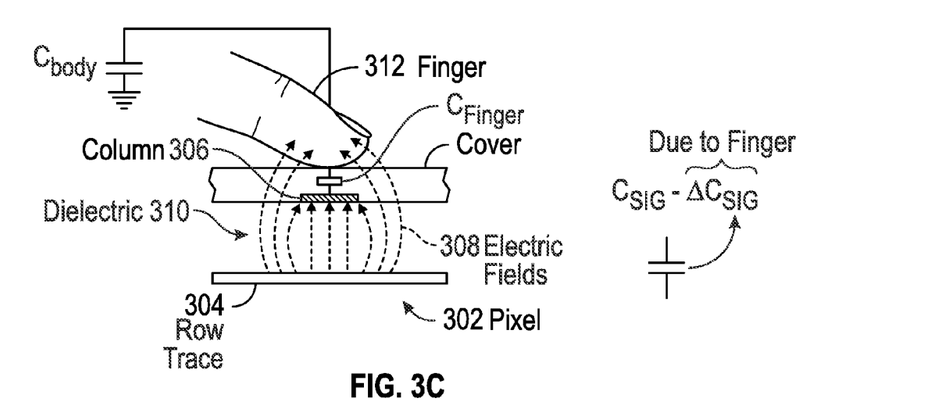
FIG. 3C illustrates a side view of an exemplary pixel in a dynamic (touch) condition according to examples of the disclosure.

FIG. 3C illustrates a side view of an exemplary pixel in a dynamic (touch) condition. An object such as finger 312 can be placed near pixel 302. Finger 312 can be a low-impedance object at signal frequencies, and can have an AC capacitance Cfinger from the column trace 306 to the body. The body can have a self-capacitance to ground Cbody of about 200 pF, where Cbody can be much larger than Cfinger. If finger 312 blocks some electric field lines 308 between row and column electrodes (those fringing fields that exit the dielectric 310 and pass through the air above the row electrode), those electric field lines can be shunted to ground through the capacitance path inherent in the finger and the body, and as a result, the steady state signal capacitance Csig can be reduced by ΔCsig. In other words, the combined body and finger capacitance can act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig-ΔCsig, where Csig represents the dynamic (touch) component. Note that Csig-ΔCsig may always be nonzero due to the inability of a finger, palm or other object to block all electric fields, especially those electric fields that remain entirely within dielectric 310. In addition, it should be understood that as finger 312 is pushed harder or more completely onto the touch sensor panel, finger 312 can tend to flatten, blocking more and more of the electric field lines 308, and thus ΔCsig can be variable and representative of how completely finger 312 is pushing down on the panel (i.e., a range from "no-touch" to "full-touch").

Figure 4A:
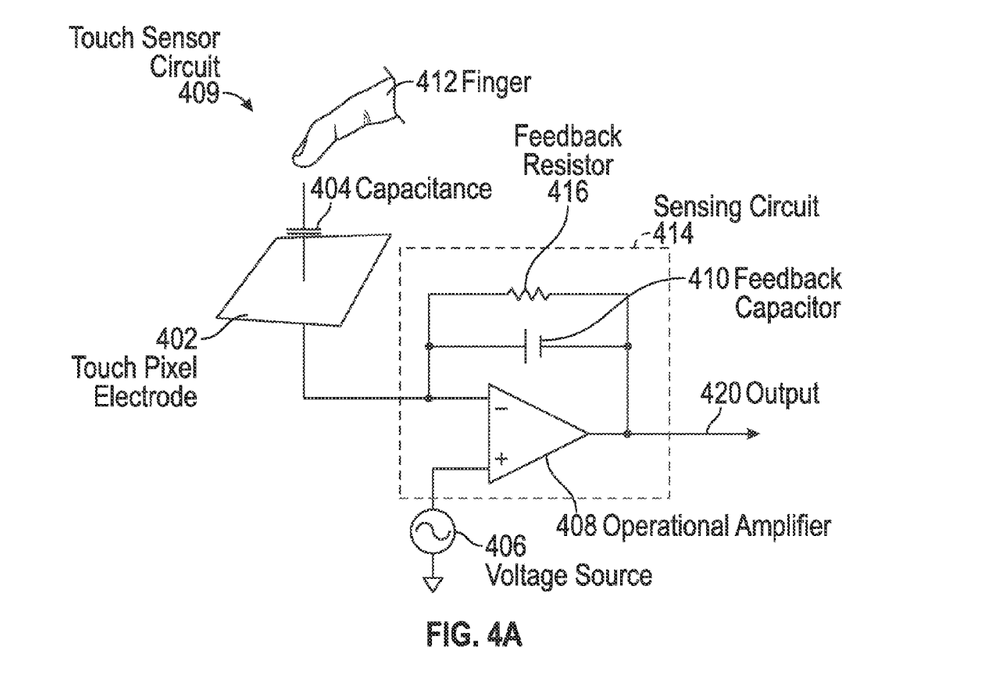
FIG. 4A illustrates an exemplary touch sensor circuit corresponding to a self-capacitance touch pixel electrode and sensing circuit according to examples of the disclosure.

FIG. 4A illustrates an exemplary touch sensor circuit corresponding to a self-capacitance touch pixel electrode and sensing circuit according to examples of the disclosure. Touch sensor circuit 409 can have a touch pixel electrode 402 with an inherent self-capacitance to ground associated with it, and also an additional self-capacitance to ground that can be formed when an object, such as finger 412, is in proximity to or touching the touch pixel electrode 402. The total self-capacitance to ground of touch pixel electrode 402 can be illustrated as capacitance 404. Touch pixel electrode 402 can be coupled to sensing circuit 414. Sensing circuit 414 can include an operational amplifier 408, feedback resistor 416, feedback capacitor 410 and an input voltage source 406, although other configurations can be employed. For example, feedback resistor 416 can be replaced by a switch capacitor resistor in order to minimize any parasitic capacitance effect caused by a variable feedback resistor. Touch pixel electrode 402 can be coupled to the inverting input of operational amplifier 408. An AC voltage source 406 can be coupled to the non-inverting input of operational amplifier 408. Touch sensor circuit 409 can be configured to sense changes in the total self-capacitance 404 of touch pixel electrode 402 induced by finger 412 either touching or in proximity to the touch sensor panel. Output 420 can be used by a processor to determine a presence of a proximity or touch event, or the output can be inputted into a discreet logic network to determine the presence of a touch or proximity event.

Figure 4B:
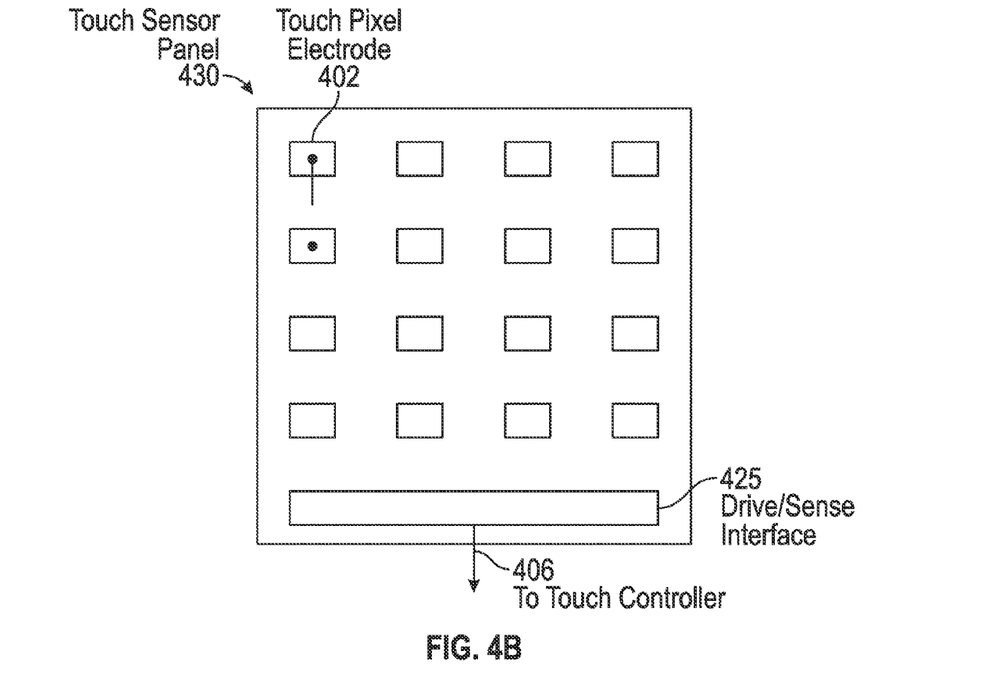
FIG. 4B illustrates an exemplary self-capacitance touch sensor panel according to examples of the disclosure.

FIG. 4B illustrates an exemplary self-capacitance touch sensor panel according to examples of the disclosure. Touch sensor panel 430 can include a plurality of touch pixel electrodes 402 coupled to sense channels in touch controller 406, can be driven by stimulation signals from the sense channels through drive/sense interface 425, and can be sensed by the sense channels through the drive/sense interface 425 as well. After touch controller 406 has determined an amount of touch detected at each touch pixel electrode 402, the pattern of touch pixels in the touch screen panel at which touch occurred can be thought of as an "image" of touch (e.g., a pattern of fingers touching the touch screen).

Figure 5:
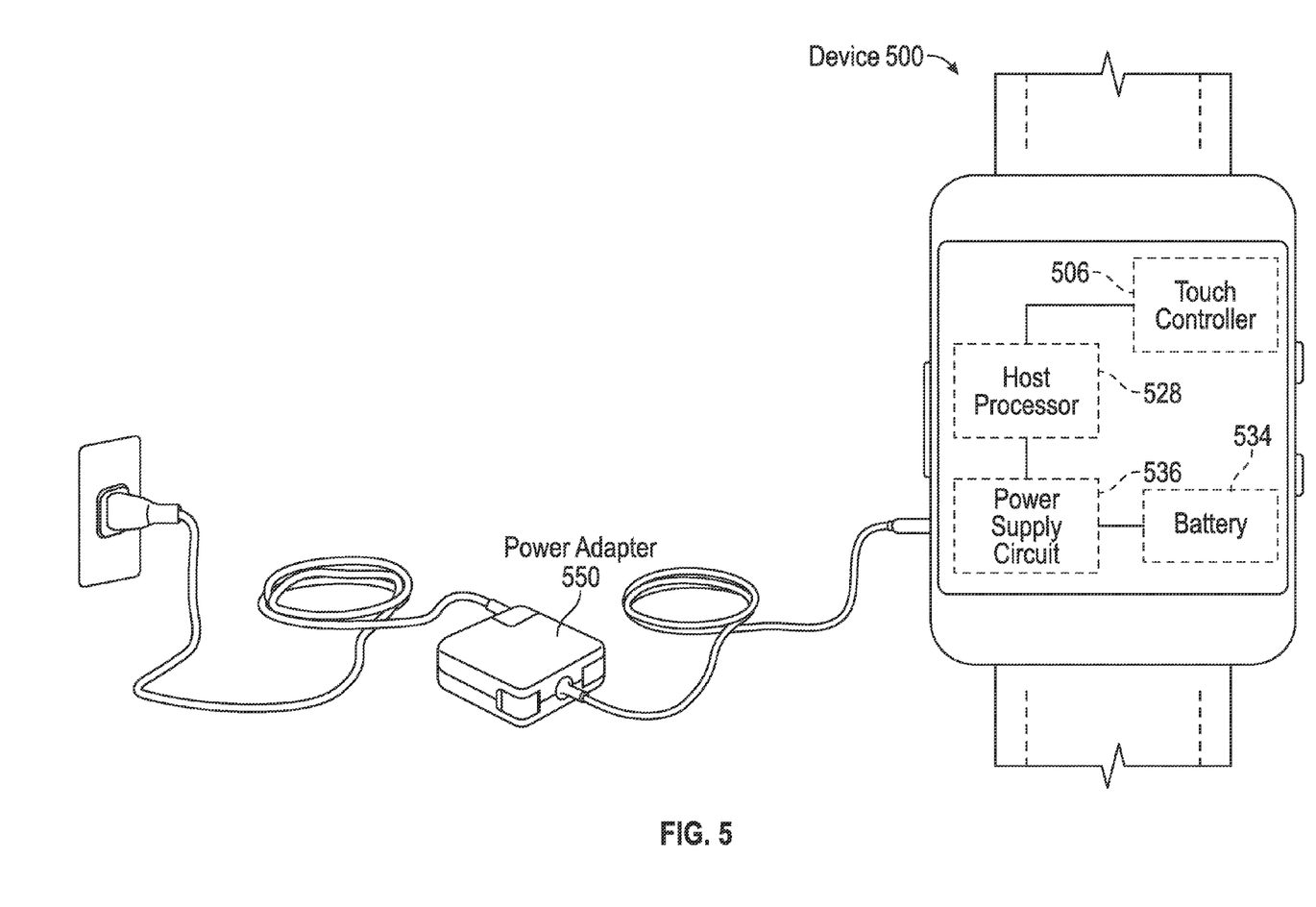
FIG. 5 illustrates an exemplary configuration of a device coupled to a power adapter according to examples of the disclosure.

FIG. 5 illustrates an exemplary configuration of a device coupled to a power adapter according to examples of the disclosure. Device 500 can be a portable electronic device that can include data processing, storage and display components that are integrated (i.e., embedded or otherwise made an operating part of the device) into the device and are powered by a battery 534. The term "battery" is used generically here to refer to a rechargeable power system such as a fuel cell system that can be replenished by being coupled to an external power source such as power adapter 550. Battery 534 can be, for example, a Lithium ion battery. In some examples, the charger can be any source that provides power to the battery and can include charging through a wired or wireless connection.

Device 500 can include a power supply circuit 536. Power supply circuit 536 can be coupled to various components of device 500 such as host processor 528. Power supply circuit 536 can draw current from battery 534 and can supply the current to the rest of the components of device 500. Power supply circuit 536 can also include a switching voltage regulator and/or a dc-dc converter, to maintain a regulated power supply voltage needed by the components.

Power supply circuit 536 can also include a power management unit to perform various power management functions. The power management functions can include detecting whether or not device 500 is coupled to power adapter 550, monitoring available energy in battery 534, and notifying the host processor 528 of a low battery state. The power supply circuit 536 can detect whether or not device 500 is coupled to power adapter 550 by monitoring an input voltage level, for example. If the input voltage level is above a predetermined value, the power supply circuit 536 can determine that device 500 is coupled to power adapter 550. If the input voltage is level is below the predetermined value, the power supply circuit 536 can determine that device 500 is not coupled to power adapter 550. In response to receiving the low battery notification, the host processor 528 can perform any number of functions including switching to a low power consumption mode.

Power adapter 550 can introduce or add noise during the process of charging battery 534 or while power adapter 550 is coupled to device 500. A touch pixel, such as touch pixel 302 of FIG. 3A and touch pixel electrode 402 of FIG. 4A, stimulated by a noise source, such as power adapter 550, can adversely affect one or more components, such as the touch sensor panel. In some examples, power adapter 550 can inform power supply circuit 536 that a charge is being supplied instead of, or in addition to, the power supply circuit 536 detecting that the device 500 is coupled to power adapter 550. For example, the power adapter can send a predetermined message to device 500. If the power adapter 550 is coupled to device 500, the predetermined message can be received by power supply circuit 536 and can serve as an indication of a charge being supplied.

In some examples, the stimulating noise source can cause false touch readings for untouched locations on the touch sensor panel. This can occur when the noise source stimulates a sensor from the sensor location currently being stimulated by a drive line at an untouched location in the touch sensor panel. Since different sensors can share the same sense line in certain touch sensor panel configurations, a false touch event can be indicated when a panel-stimulated signal generated on a sense line by a sensing element at a non-touched sensor is combined with a noise-stimulated signal generated on the same sense line by a sensing element at a different touch sensor. Since a touch event is indicated at the intersection between the panel-stimulated drive line and the touch-indicating sense line, the panel can incorrectly identify a touch at the untouched location. In some examples, the stimulating noise source can cause saturation of analog touch detection circuitry (i.e., drive circuitry), thereby preventing the sense circuitry from recognizing a touch event.

Figure 6A:
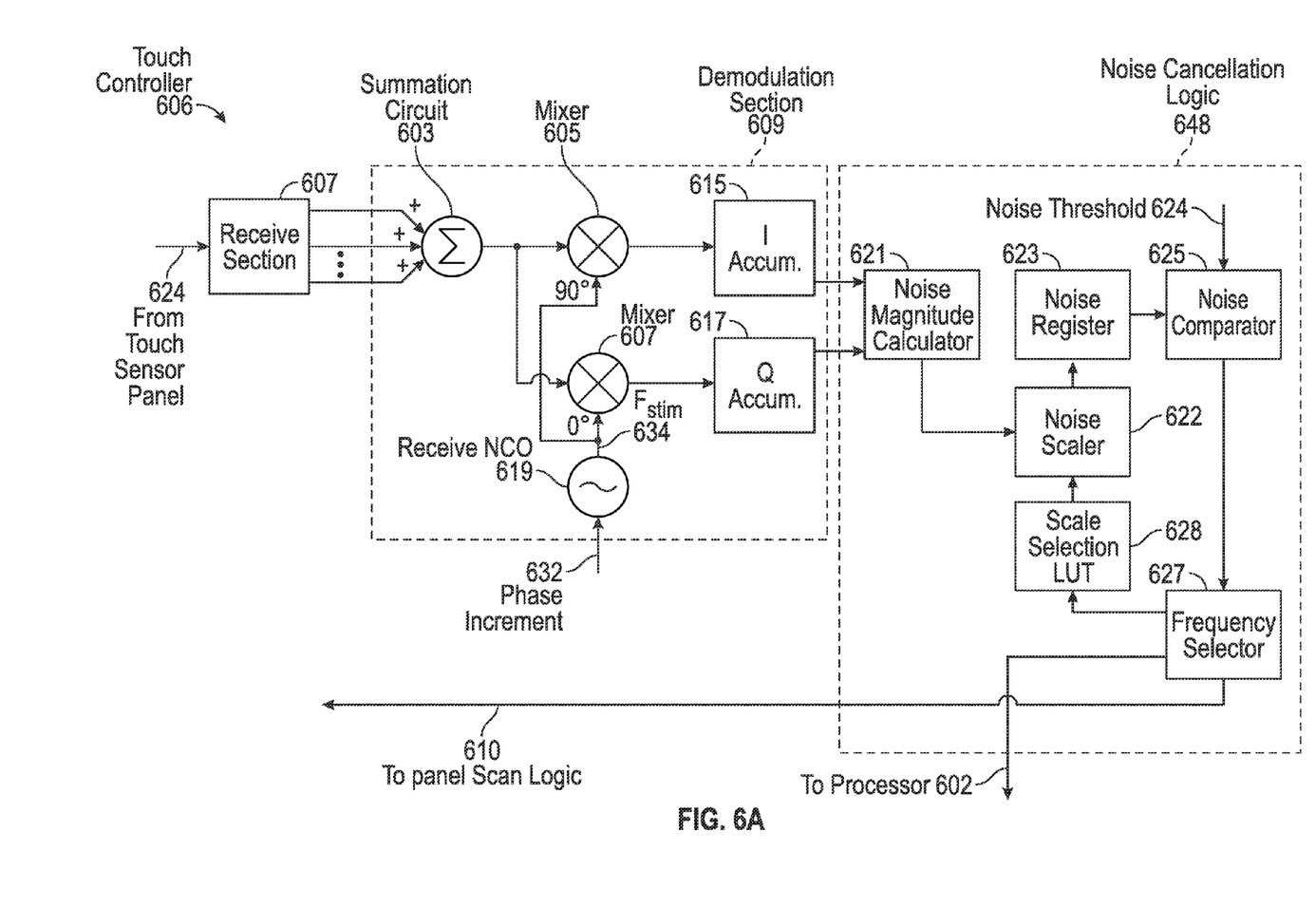
FIG. 6A illustrates an exemplary circuit for a power charging touch mode including low noise frequency selection according to examples of the disclosure.
Figure 6B:
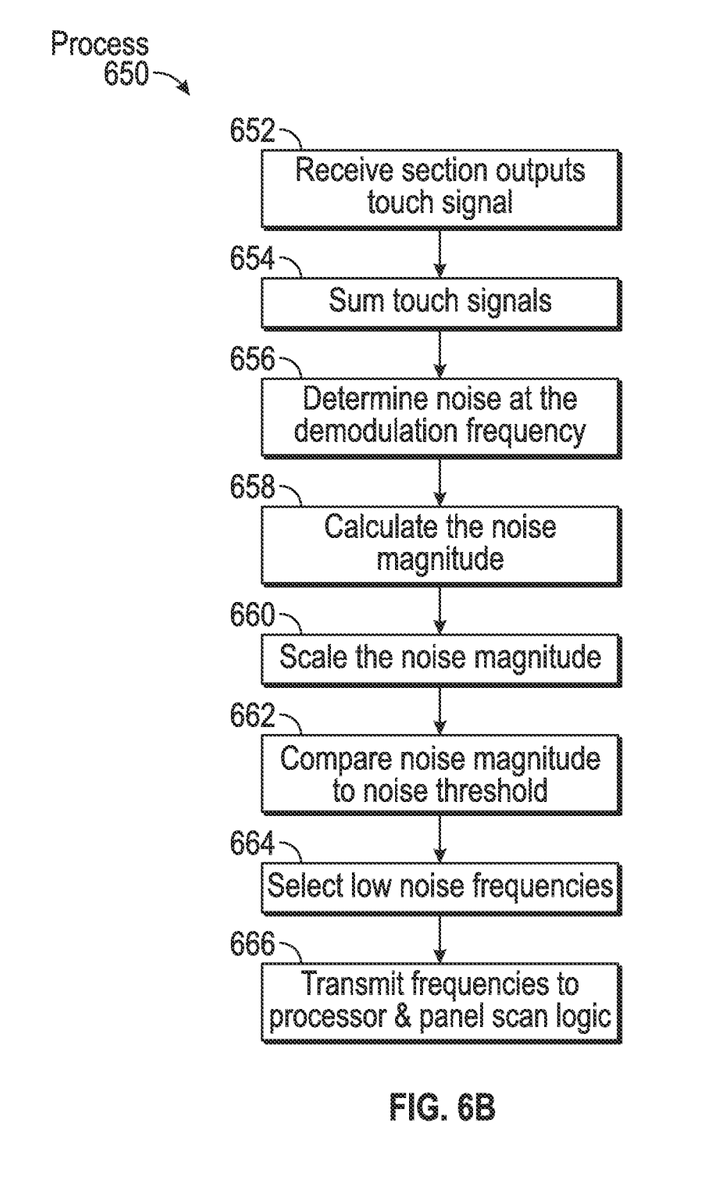
FIG. 6B illustrates a process for an exemplary power charging touch mode including low noise frequency selection according to examples of the disclosure.

In response to receiving a notification when power adapter 550 is coupled to device 500, host processor 528 can perform any number of functions including switching to a different touch scan mode (e.g., power charging touch mode). To prevent adverse effects to the touch sensor panel while the device is charging, the power charging touch mode can cancel or reduce noise from the touch scan or touch image. FIG. 6A illustrates an exemplary circuit and FIG. 6B illustrates a process for an exemplary power charging touch mode including low noise frequency selection according to examples of the disclosure. In the example of FIG. 6A, receive section 607 of touch controller 606 can include sense channels (not shown) to receive and process touch signals indicative of a touch event at touch sensor panel 624. The receive section 607 can output the processed touch signals (step 652 of process 650). The demodulation section 609 of touch controller 606 can include a summation circuit 603, mixers 605 and 607, in-phase (I) accumulator 615, quadrature (Q) accumulator 617, and receive numerically controlled oscillator (NCO) 619. The summation circuit 603 can sum the processed touch signals outputted by the sense channels (step 654). Mixer 605 can demodulate the output of summation circuit 603 with an in-phase (I) frequency component of demodulation waveform Fstim 634 to determine an amount of noise on the output at that demodulation frequency (step 656). In some examples, Fstim 634 can be an envelope shaped digitally synthesized sine wave, such as a rectangular, Chebychev, Gaussian, etc., waveform, depending on the frequency response desired. Mixer 607 can also demodulate the output of the summation circuit 603 with a quadrature (Q) frequency component of Fstim 634 to determine an amount of noise on the output at that demodulation frequency (step 656). Mixers 605 and 607 can have a bandpass filter response. The in-phase (I) accumulator 615 can accumulate noise component from mixer 605. Quadrature (Q) accumulator 617 can accumulate the quadrature noise component from mixer 607. Receive NCO 619 can receive a numerical control input to set the demodulation frequency of Fstim 634. Numerical control input can be phase increment 632, which can be proportional to the demodulation frequency of Fstim 634 outputted by receive NCO 619.

Noise cancellation logic 648 of touch controller 606 can include noise magnitude calculator 621, noise scaler 622, noise register 623, noise comparator 625, noise scale selection lookup table (LUT) 628, and frequency selector 627. The noise magnitude calculator 621 can connect to the in-phase and quadrature noise components. In some examples, the noise magnitude calculator 621 can calculate the noise magnitude as the sum of the squares of the in-phase and quadrature components (step 658). Other calculators can also be used.

In step 660, noise scaler 622 can receive the calculate noise magnitude from the noise magnitude calculator 621 for scaling the magnitude with a noise scale factor from the noise scale selection LUT 628. The noise scale factor can be selected from the noise scale selection LUT 628 based on low noise frequency data outputted by the frequency selector 627.

Noise register 623 can receive the calculated noise magnitude from the noise magnitude calculator 621 for temporary storage. The noise comparator 625 can access the noise register 623 to compare the calculated noise magnitude to noise threshold 629 (step 662). The noise threshold 629 can be static, dynamic, or a combination thereof, depending on the needs of touch controller 606.

Frequency selector 627 can receive the result of the comparison between noise magnitude calculator 621 and noise threshold 629 from the noise comparator 625. The comparison result can be used for selecting one or more low noise frequencies to be used to stimulate the touch sensor panel 624 to generate the touch signals subsequently received by receive section 607 (step 664). The low noise frequencies can be transmitted to processor 602 and/or panel scan logic 610 (step 666). Processor 602 can select one or more of the low noise frequencies yielding the lowest noise values. Upon selecting the appropriate one or more low noise frequencies, processor 602 can initiate a touch sensor panel scan at the selected one or more low noise frequencies. In some examples, processor 602 can determine that the noise level across a selected frequency range is too high and can initiate another spectral scan to identify new low noise frequencies.

In some examples, low noise frequency selection can be determined using the peak-to-peak magnitude of the touch signals. Each touch pixel can be stimulated at two or more different frequencies, and the touch pixel can be measured multiple times to produce a plurality of sub-samples. The peak-to-peak magnitude of the plurality of sub-samples for the two or more different frequencies can be compared. The frequency with the lowest peak-to-peak magnitude can be selected as a low noise frequency. In some examples, the peak-to-peak magnitude can be compared to a threshold value. The frequencies with peak-to-peak magnitude greater than the threshold value can be discarded.

Figure 7A:
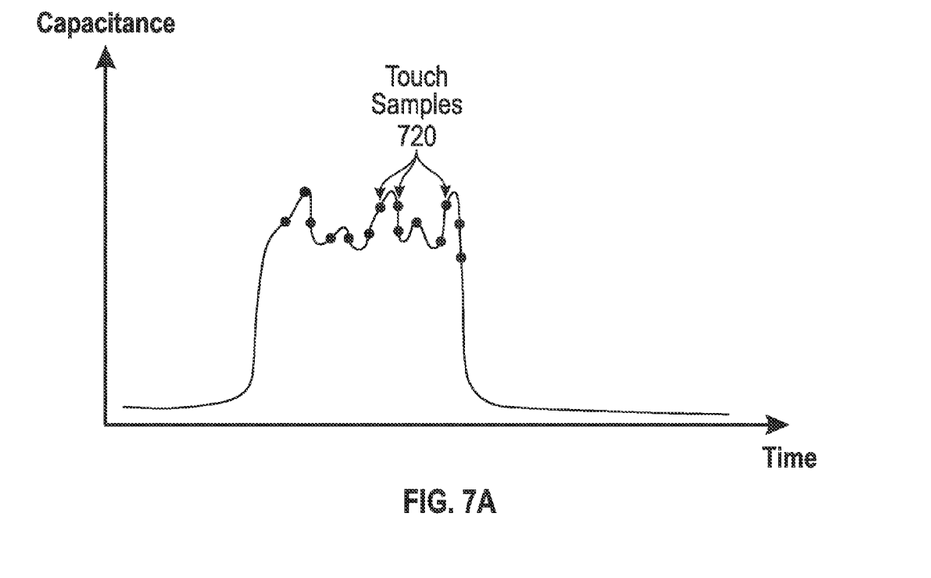
FIG. 7A illustrates measured capacitance values for a normal touch mode.

Another power charging touch mode can include increasing the number of touch samples employed to calculate an average. FIG. 7A illustrates measured capacitance values for a single touch pixel for a normal touch mode. In a normal touch mode (i.e., when the device is not charging), the touch pixels on the touch sensor panel can be sampled at a given touch sampling rate. For example, in a normal touch mode, the touch sampling rate can be 60 Hz. The touch signal or measured capacitance can be determined by sampling a touch pixel, and then averaging touch samples 720 to calculate a touch value for that touch pixel. For example, as shown in FIG. 7A, 14 touch samples 720 for a single touch pixel can be averaged to determine a touch value for that pixel.

Figure 7B:
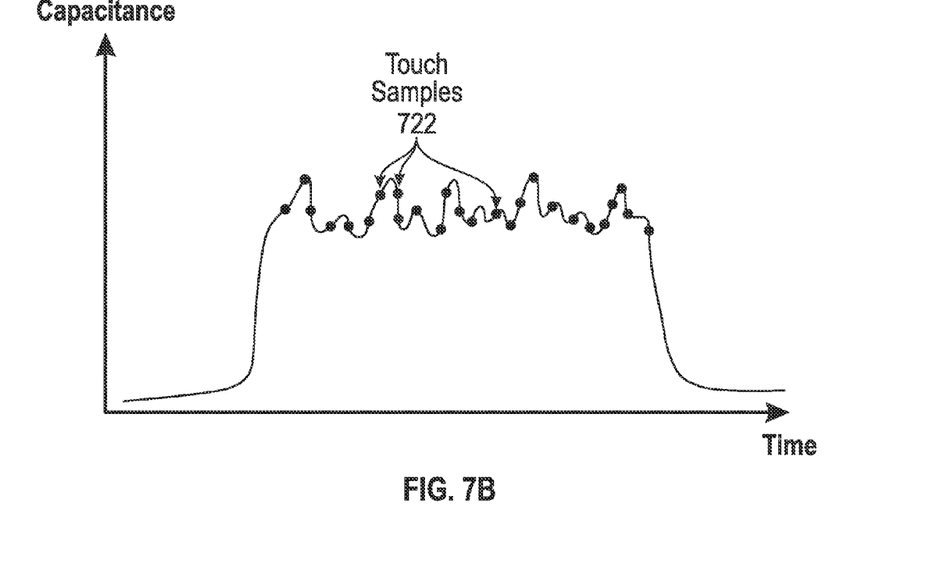
FIG. 7B illustrates measured capacitance values for a power charging touch mode according to examples of the disclosure.

When the device is connected to a power adapter (such as illustrated in FIG. 5), the touch controller can switch to a power charging touch mode. As shown in FIG. 7B, the power charging touch mode can have a higher number of touch samples 722 compared to the number of touch samples 720 of FIG. 7A. There can be 28 touch samples 722 in a power charging touch mode, for example. By increasing the number of touch samples 722 (compared to the number of touch samples 720), the calculated touch value can improve the signal-to-noise ratio. Averaging the touch samples 722 can effectively attenuate or average out the noise due to the higher number of touch samples. That is, by sampling a higher number of touch samples (e.g., touch samples 722 in FIG. 7B) or dynamically changing the sampling length, touch samples can include touch values both greater than and less than the noise-free touch value. By averaging touch samples that include touch values both greater than and less than the noise-free touch value, the calculated average capacitance value can be accurate and representative of the noise-free touch value. In some examples, if there are an insufficient number of touch samples (e.g., touch samples 720 in FIG. 7A), the calculated average capacitance value may be inaccurate. For example, touch values may be greater than the noise-free touch value (or less than the noise-free touch values). In such a situation, the calculated average touch value can be lower (i.e., offset) than the noise-free touch value. The calculated average touch value from touch samples 720 may be different from the calculated average touch value from touch samples 722 and from the noise-free touch value.

Figure 8A:
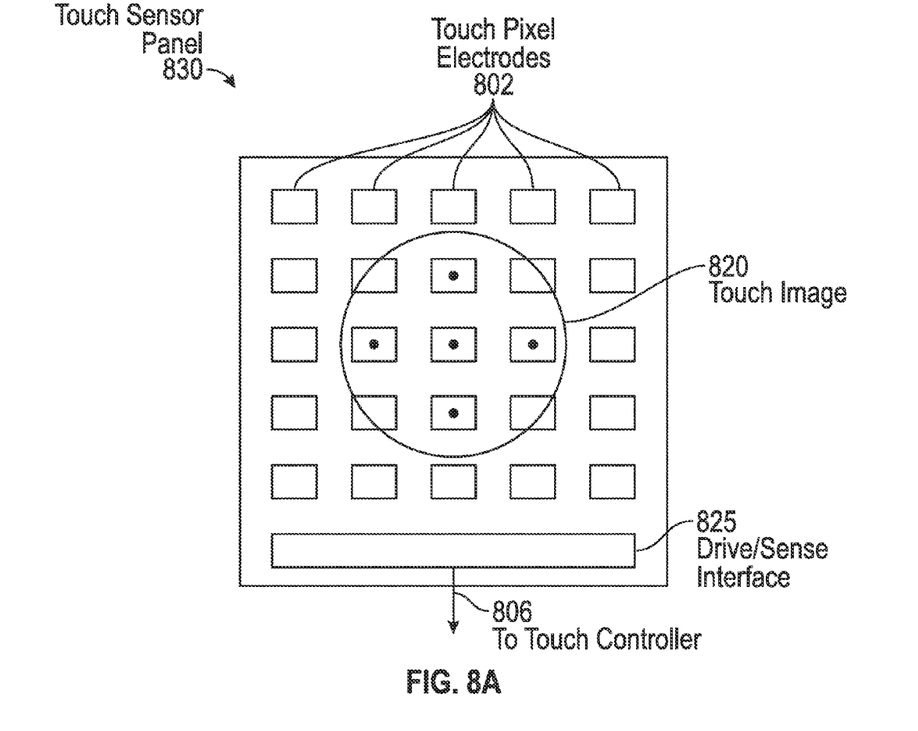
FIG. 8A illustrates a touch image for an exemplary power charging touch mode including simultaneous sampling according to examples of the disclosure.

Another power charging touch mode can include simultaneous sampling, such as illustrated in FIG. 8A. Touch sensor panel 830 can include a plurality of touch pixel electrodes 802 and a drive/sense interface 825 coupled to a touch controller 806. An object touching or hovering over touch sensor panel 830 can form a touch image 820.

Each touch pixel electrode 802 can have a measured touch response $P_i$, where the touch sensor panel 830 has M touch pixel electrodes 802 and $i=1, \ldots, M$. At any given time, a noise N from a power adapter, for example, can equally affect the measured touch response $P_i$ for all or some of the touch pixel electrodes 802. Correlation between touch response $P_i$ and noise N into the touch pixel electrodes 802 can be maintained.

The measured touch response of a given touch pixel electrode 802 can be determined as:

$$Pi = Ti + Ti \times N \quad (1)$$

where Ti represents the true noise-free touch response on touch pixel electrode i and N represents the noise.

The X-coordinate value of the center of mass of touch image 820 can be determined as:

$$X_{CM} = \frac{\sum_{i=1}^{M} Pi \times Xi}{\sum_{i=1}^{M} Pi} \quad (2)$$

where Xi is the X-coordinate value of the center of mass of a given touch pixel electrode 802.

Applying equation (1) to equation (2), the X-coordinate value of the center of mass of touch image 820 can be simplified to:

$$X_{CM} = \frac{\sum_{i=1}^{M} Ti \times Xi}{\sum_{i=1}^{M} Ti} \times \frac{1+N}{1+N} \quad (3)$$

Equation (3) can be further simplified to:

$$X_{CM} = \frac{\sum_{i=1}^{M} Ti \times Xi}{\sum_{i=1}^{M} Ti} \quad (4)$$

Similarly, the Y-coordinate value of the center of mass of touch image 820 can be determined as:

$$Y_{CM} = \frac{\sum_{i=1}^{M} Pi \times Yi}{\sum_{i=1}^{M} Pi} \quad (5)$$

$$Y_{CM} = \frac{\sum_{i=1}^{M} Ti \times Yi}{\sum_{i=1}^{M} Ti} \quad (6)$$

where Yi is the Y-coordinate value of the center of mass of a given touch pixel electrode 802.

Although each touch pixel electrode 802 can be affected by noise N, the computed X- and Y-coordinate values of the center of mass of touch image 820 can be independent of noise N, as shown in equations (4) and (6).

Figure 8B:
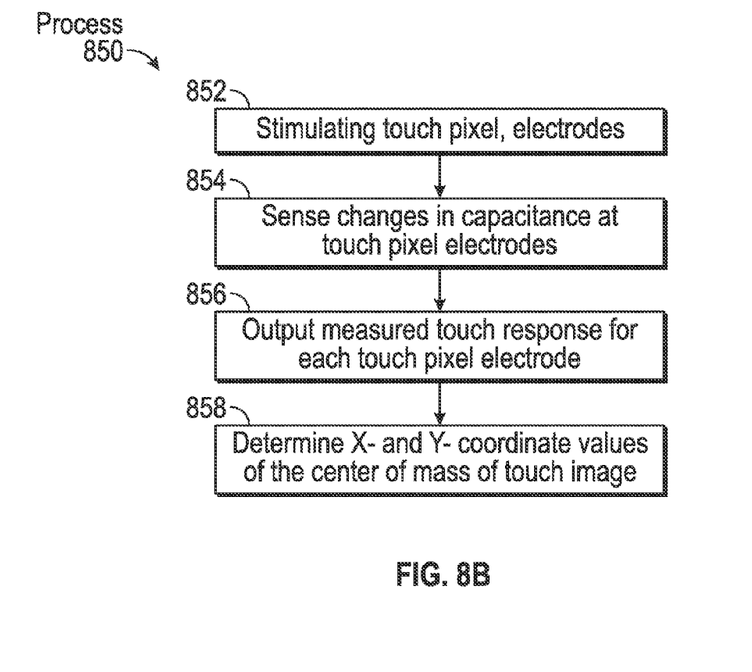
FIG. 8B illustrates a process for an exemplary power charging touch mode including simultaneous sampling according to examples of the disclosure.

FIG. 8B illustrates a process for an exemplary power charging touch mode including simultaneous sampling according to examples of the disclosure. Process 850 can include stimulating all or a subset of all of the touch pixel electrodes 802 of touch sensor panel 830 with drive circuitry (step 852). In step 854, changes in capacitance due to a touch or proximity at the touch pixel electrodes 802 can be sensed using sense circuitry. For each touch pixel electrode 802, drive/sense interface 825 can output the measured touch response Pi to touch controller 806 (step 856). From the measured touch response Pi of each touch pixel electrode 802, the X- and Y-coordinate values of the center of mass of touch image 820 can be determined one or more scalers or multipliers, one or more adders, and/or one or more dividers to perform calculations using equations (2) and (5) in step 858. In step 858, a noise-free center of mass coordinate value for the touch response can be calculated.

For the one or more power charging touch modes, the power consumption of the device can be increased due to the increased amount of processing. As such, in some examples, the power supply circuit can send a notification to the host processor when device 500 is no longer coupled to power adapter. In response to the notification, the host processor can switch back to a normal touch scan mode.

Figure 9:
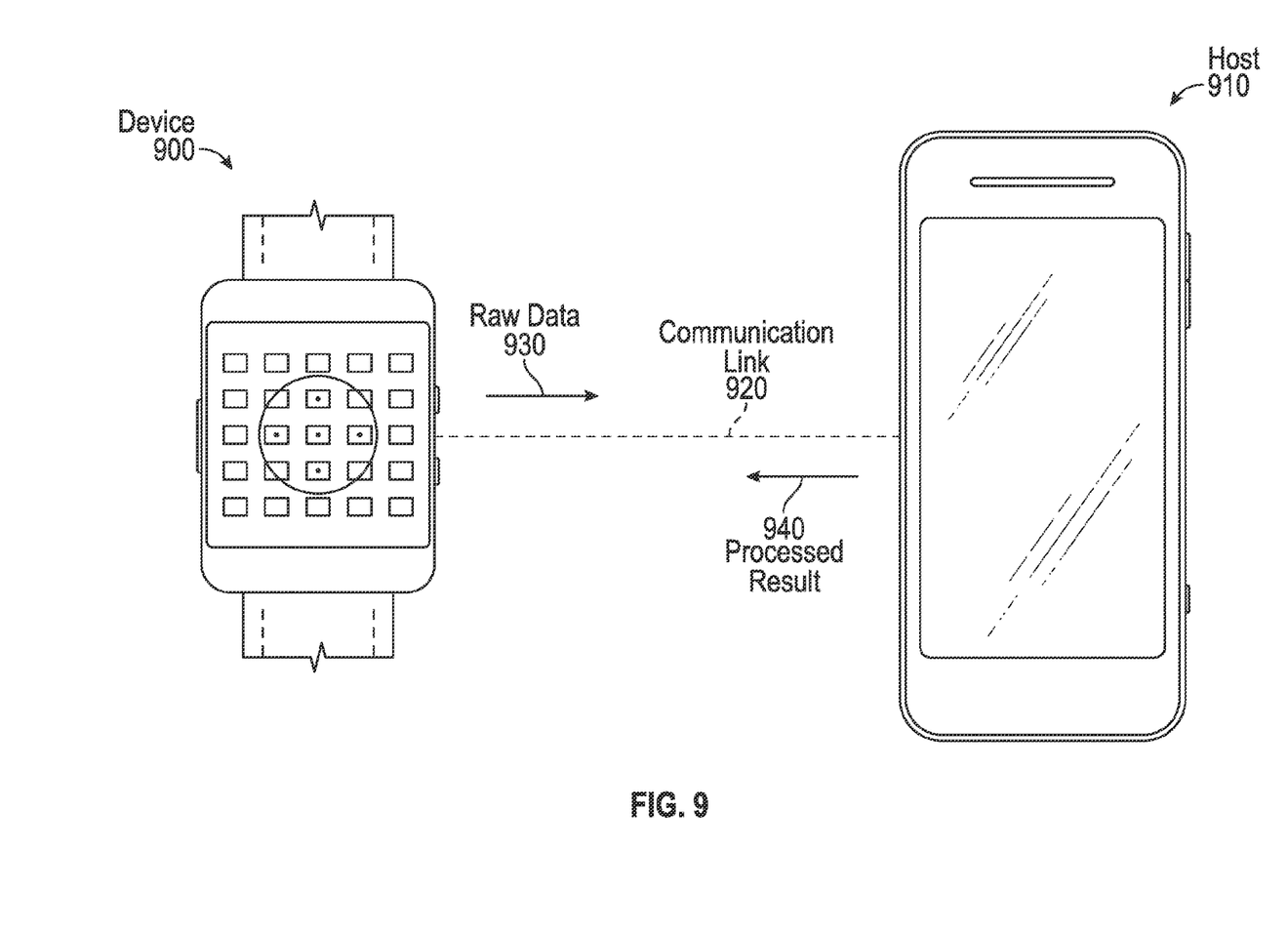
FIG. 9 illustrates an exemplary configuration in which a device is connected to a host according to examples of the disclosure.

In some examples, the host processor can select one or more low noise frequencies, increase the number of touch samples to average, and/or process the simultaneous sampling information for the power charging touch modes. In some examples, the processing need not be performed on the device itself. FIG. 9 illustrates an exemplary configuration in which a device is connected to a host according to examples of the disclosure. Host 910 can be any device external to device 900 including, but not limited to, any of the systems illustrated in FIGS. 1A-1C or a server, for example. Device 900 can be connected to host 910 through communications link 920. Communications link 920 can be any connection including, but not limited to, a wireless connection and a wired connection. Exemplary wireless connections can be Wi-Fi, Bluetooth, Wireless Direct, and Infrared. Exemplary wired connections can be Universal Serial Bus (USB), FireWire, Thunderbolt, or any connection requiring a physical cable.

In operation, instead of processing the information on device 900 itself, device 900 can send raw data 930 over communications link 920 to host 910. Host 910 can receive raw data 930, and host 910 can process the information. Processing the information can include calculating a noise magnitude and selecting one or more low noise frequencies, determining a number of samples to average and averaging the touch samples to calculate a touch value, and determining X- and Y-coordinate values of the center of mass using simultaneous sampling. Host 910 can also include storage or memory for tracking selected low frequencies, selected number of touch samples to average, and noise values. Host 910 can send the processed result 940 or related information back to device 900. Based on the processed result 940, device 900 can notify the user or adjust its operation accordingly. By offloading the processing and/or storage of the information, device 900 can conserve space and power enabling device 900 to remain small and portable, as space that could otherwise be required for processing logic can be freed up on the device.

In some examples, a method for scanning a touch sensor panel in a device is disclosed. The method may comprise: scanning the touch sensor panel in a non-charging scan mode; receiving a first indication that the device is operatively coupled to a charger; and responsive to the first indication, switching to a charging scan mode different from the non-charging scan mode, wherein the charging scan mode comprises dynamically changing a length of sample time during a touch scan. Additionally or alternatively to one or more examples disclosed above, in other examples, the method further comprises: sampling a touch pixel in the touch sensor panel a first number of times, wherein the first number is greater than a second number, the second number being associated with the non-charging scan mode; and averaging touch values from the sampled touch pixel. Additionally or alternatively to one or more examples disclosed above, in other examples, one or more touch values is greater than the average and one or more touch values is less than the average. Additionally or alternatively to one or more examples disclosed above, in other examples, the method further comprises a center of mass calculation, the center of mass calculation comprising: stimulating one or more touch pixels of the touch sensor panel at a same time; and scanning the one or more touch pixels to determine a plurality of touch values. Additionally or alternatively to one or more examples disclosed above, in other examples, the method further comprises: scaling each of the plurality of touch values to form a plurality of scaled touch values; summing the plurality of scaled touch values; summing the plurality of touch values; and dividing the summed scaled touch values by the summed touch values. Additionally or alternatively to one or more examples disclosed above, in other examples, scaling each of the plurality of touch values includes multiplying each of the plurality of touch values by a center of mass of the one or more touch pixels. Additionally or alternatively to one or more examples disclosed above, in other examples, a number of stimulated touch pixels is same as a number of touch pixels in the touch sensor panel. Additionally or alternatively to one or more examples disclosed above, in other examples, the first indication is received from a power supply circuit. Additionally or alternatively to one or more examples disclosed above, in other examples, the first indication is received from a circuit coupled to a power adapter. Additionally or alternatively to one or more examples disclosed above, in other examples, the method further comprises: receiving a second indication that the device is decoupled from a charger, and switching to the non-charging scan mode, when the second indication has been received.

In some examples, a method of a first device communicating with a second device is disclosed. The method may comprise: sending, to a second device, one or more touch values from sense circuitry; and receiving, from the second device, at least one of a touch value and a center of mass location.

In some examples, a touch sensor panel is disclosed. The touch sensor panel may comprise: logic configured to receive a first indication that the device is operatively coupled to a charger, wherein the logic is further configured to switch between a charging scan mode different from a non-charging scan mode, when the first indication has been received, wherein the charging scan mode comprises dynamically changing a length of sample time during a touch scan. Additionally or alternatively to one or more examples disclosed above, in other examples, the touch sensor panel further comprises sense circuitry configured to sample the touch pixel in the touch sensor panel a first number of times, wherein the first number is greater than a second number, the second number being associated with the non-charging scan mode, and wherein the logic is further configured to average touch values from the sampled touch pixel. Additionally or alternatively to one or more examples disclosed above, in other examples, one or more touch values is greater than the average and one or more touch values is less than the average. Additionally or alternatively to one or more examples disclosed above, in other examples, the touch sensor panel further comprises: drive circuitry configured to stimulate one or more touch pixels of the touch sensor panel at a same time; and sense circuitry configured to scan the one or more touch pixels to determine a plurality of touch values. Additionally or alternatively to one or more examples disclosed above, in other examples, the touch sensor panel further comprises: a scaler configured to scale each of the plurality of touch values to form a plurality of scaled touch values; an adder configured to sum the plurality of scaled touch values; an adder configured to sum the plurality of touch values; and a divider configured to divide the summed scaled touch values by the summed touch values. Additionally or alternatively to one or more examples disclosed above, in other examples, the scaler is further configured to multiple each of the plurality of touch values by a center of mass of the one or more touch pixels. Additionally or alternatively to one or more examples disclosed above, in other examples, the first indication is received by a power supply circuit. Additionally or alternatively to one or more examples disclosed above, in other examples, the first indication is received from a circuit coupled to a power adapter. Additionally or alternatively to one or more examples disclosed above, in other examples, the logic is further configured to receive a second indication representative of a non-charge from the circuit and switch to the non-charging scan mode, when the second indication has been received.

While various examples have been described above, it should be understood that they have been presented by way of example only, and not by way of limitation. Although examples have been fully described with reference to the accompanying drawings, the various diagrams may depict an example architecture or other configuration for this disclosure, which is done to aid in the understanding of the features and functionality that can be included in the disclosure. The disclosure is not restricted to the illustrated exemplary architectures or configurations, but can be implemented using a variety of alternative architectures and configurations. Additionally, although the disclosure is described above in terms of various examples and implementations, it should be understood that the various features and functionality described in one or more of the examples are not limited in their applicability to the particular example with which they are described. They instead can be applied alone or in some combination, to one or more of the other examples of the disclosure, whether or not such examples are described, and whether or not such features are presented as being part of a described example. Thus, the breadth and scope of the present disclosure should not be limited by any of the above-described examples.

What is claimed is:

1. A method comprising:
scanning a touch sensor panel of a first device in a mode;
receiving a first indication from a power supply circuit of the first device; and
in response to receiving the first indication:
in accordance with a determination that the first indication corresponds to a notification that the first device is not coupled to a charger located external to the first device, setting the mode to a first mode,
in accordance with a determination that the first indication corresponds to a signal received at a first time from the charger and indicating that the charger is at the first time supplying charge to the first device, setting the mode to a second mode, and
in accordance with a determination that the first indication corresponds to a low power state of a battery of the first device, setting the mode to a third mode, wherein:
the first mode comprises a non-charging scan mode,
the second mode comprises a power charging scan mode, the power charging scan mode comprising dynamically changing a length of sample time during a touch scan, and
the third mode comprises a low power consumption mode.

2. The method of claim 1, wherein the power charging scan mode further comprises:
sampling a touch pixel in the touch sensor panel a first number of times, wherein the first number is greater than a second number, the second number being associated with the non-charging scan mode; and
averaging touch values from the sampled touch pixel.

3. The method of claim 2, wherein one or more touch values is greater than the average and one or more touch values is less than the average.

4. The method of claim 1, wherein the power charging scan mode further comprises a center of mass calculation, the center of mass calculation comprising:
stimulating one or more touch pixels of the touch sensor panel at a same time; and
scanning the one or more touch pixels to determine a plurality of touch values.

5. The method of claim 4, wherein the power charging scan mode further comprises:
scaling each of the plurality of touch values to form a plurality of scaled touch values;
summing the plurality of scaled touch values;
summing the plurality of touch values; and
dividing the summed scaled touch values by the summed touch values.

6. The method of claim 5, wherein scaling each of the plurality of touch values includes multiplying each of the plurality of touch values by the center of mass of the one or more touch pixels.

7. The method of claim 4, wherein a number of stimulated touch pixels is same as a number of touch pixels in the touch sensor panel.

8. The method of claim 1, wherein the first indication is received when an input voltage level is greater than a predetermined value.

9. The method of claim 1, further comprising:
receiving a second indication; and in response to receiving the second indication:
in accordance with a determination that the second indication corresponds to a signal that the first device is decoupled from the charger, setting the mode to the first mode.

10. The method of claim 1, further comprising:
sending, to a second device, one or more touch values from sense circuitry; and
receiving, from the second device, at least one of a touch value and a center of mass location.

11. A touch sensor panel comprising:
logic configured to scan the touch sensor panel in a mode and to receive a first indication from a power supply circuit,
wherein the logic is further configured to, in response to receiving the first indication:
in accordance with a determination that the first indication corresponds to a notification that the touch sensor panel is not coupled to a charger located external to the touch sensor panel, set the mode to a first mode,
in accordance with a determination that the first indication corresponds to a signal received at a first time from the charger and indicating that the charger is at the first time supplying charge to the touch sensor panel, set the mode to a second mode, and
in accordance with a determination that the first indication corresponds to a low power state of a battery, set the mode to a third mode,
wherein:
the first mode comprises a non-charging scan mode,
the second mode comprises a power charging scan mode, the power charging scan mode comprising dynamically changing a length of sample time during a touch scan, and
the third mode comprises a low power consumption mode.

12. The touch sensor panel of claim 11, further comprising sense circuitry configured to, in the power charging scan mode, sample a touch pixel in the touch sensor panel a first number of times, wherein the first number is greater than a second number, the second number being associated with the non-charging scan mode, and
wherein the logic is further configured to average touch values from the sampled touch pixel.

13. The touch sensor panel of claim 12, wherein one or more touch values is greater than the average and one or more touch values is less than the average.

14. The touch sensor panel of claim 11, further comprising:
drive circuitry configured to, in the power charging scan mode, stimulate one or more touch pixels of the touch sensor panel at a same time; and
sense circuitry configured to, in the power charging scan mode, scan the one or more touch pixels to determine a plurality of touch values.

15. The touch sensor panel of claim 14, further comprising:
a scaler configured to, in the power charging scan mode, scale each of the plurality of touch values to form a plurality of scaled touch values;
an adder configured to, in the power charging scan mode, sum the plurality of scaled touch values;
an adder configured to, in the power charging scan mode, sum the plurality of touch values; and
a divider configured to, in the power charging scan mode, divide the summed scaled touch values by the summed touch values.

16. The touch sensor panel of claim 15, wherein the scaler is further configured to, in the power charging scan mode, multiply each of the plurality of touch values by a center of mass of the one or more touch pixels.

17. The touch sensor panel of claim 11, wherein the power supply circuit is configured to:
monitor an input voltage level,
determine whether the input voltage level is greater than a predetermined value, and
generate the first indication when the input voltage level is greater than the predetermined value.

18. The touch sensor panel of claim 11, wherein the logic is further configured to receive a second indication, and in response to receiving the second indication:
in accordance with a determination that the second indication corresponds to a signal that the touch sensor panel is decoupled from the charger, set the mode to the first mode.

* * * * *